(12) United States Patent
Cheng et al.

(10) Patent No.: US 8,540,223 B2
(45) Date of Patent: Sep. 24, 2013

(54) COMBINED DRIVING SPRING IN THE SLIDE COVER HINGE OF THE MOBILE COMMUNICATION TERMINAL

(75) Inventors: Guanlun Cheng, Hangzhou (CN); Xin Yao, Hangzhou (CN)

(73) Assignee: Hangzhou Amphenol Phoenix Telecom Parts Co., Ltd., Zhejiang Province (CN)

( * ) Notice: Subject to any disclaimer, the term of this patent is extended or adjusted under 35 U.S.C. 154(b) by 94 days.

(21) Appl. No.: 12/936,047

(22) PCT Filed: Jun. 19, 2008

(86) PCT No.: PCT/CN2008/071367
§ 371 (c)(1),
(2), (4) Date: Oct. 1, 2010

(87) PCT Pub. No.: WO2009/121229
PCT Pub. Date: Oct. 8, 2009

(65) Prior Publication Data
US 2011/0024961 A1    Feb. 3, 2011

(30) Foreign Application Priority Data
Apr. 3, 2008  (CN) .................. 2008 2 0085195 U

(51) Int. Cl.
*F16F 1/18*    (2006.01)
(52) U.S. Cl.
USPC .................. 267/159; 267/164; 455/575.4
(58) Field of Classification Search
USPC ....... 267/158, 159, 160, 164, 165; 455/575.4
See application file for complete search history.

(56) References Cited

U.S. PATENT DOCUMENTS

| 4,113,298 A * | 9/1978 | Kopp .......................... 294/104 |
| 2006/0180457 A1* | 8/2006 | Han et al. ..................... 200/550 |
| 2007/0032278 A1* | 2/2007 | Lee et al. ................... 455/575.4 |
| 2007/0091555 A1 | 4/2007 | Lee |

FOREIGN PATENT DOCUMENTS

| CN | 1649477 A | 8/2005 |
| CN | 2922312 Y | 7/2007 |
| JP | 2005159633 A | 6/2005 |
| JP | 2007-028417 A * | 2/2007 |
| WO | WO 2007/035008 A1 * | 3/2007 |

\* cited by examiner

*Primary Examiner* — Robert A Siconolfi
*Assistant Examiner* — Vu Q Nguyen
(74) *Attorney, Agent, or Firm* — Oliff & Berridge, PLC

(57) ABSTRACT

This invention provides the combined driving spring in the slide cover hinge of the mobile communication terminal. It comprises multiple springs in the same shape, the multiple springs are arranged and combined in turn on the same plane, with their both ends fixed; the driving spring is provided with connections on its both ends to match with the slide in the slide hinge. The shape of the spring is similar to the shape W. The driving spring provided by this invention can be directly used as a driving mechanism in the slide hinge for the mobile communication terminals, simplifying the structure of the driving mechanism. In particular, when the spring in the shape of W is employed, the spring can not only facilitate the combination connection, but also provide a greater force. Besides, when the slide cover slides, less area is occupied when the spring deforms, making it easier to arrange other parts of the mobiles device.

7 Claims, 5 Drawing Sheets

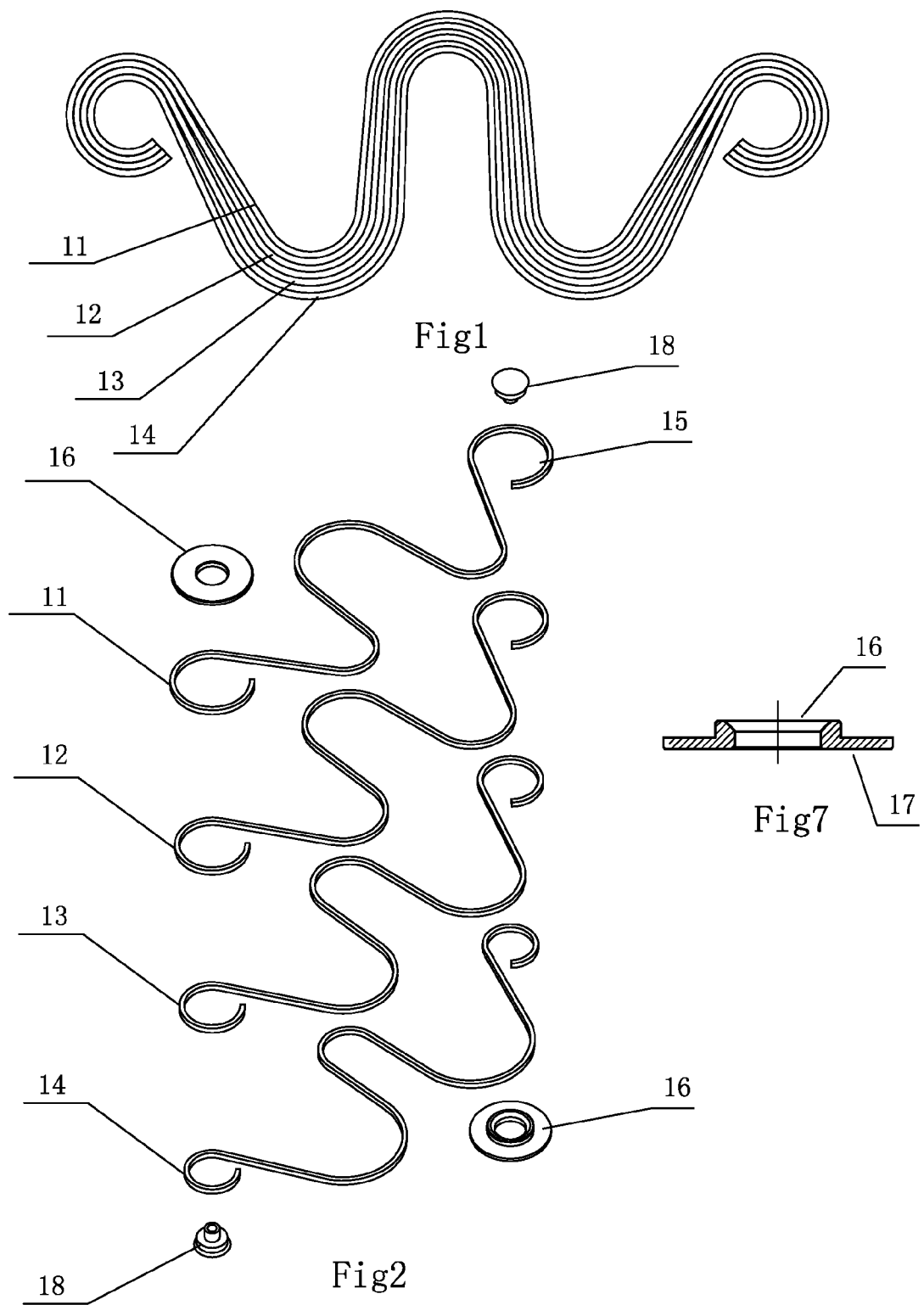

COMBINED DRIVING SPRING IN THE SLIDE COVER HINGE OF THE MOBILE COMMUNICATION TERMINAL

This is a U.S. national stage application of PCT Application No. PCT/CN/2008/071367 under 35 U.S.C. 371, filed Jun. 19, 2008 and published in Chinese, which claims the priority benefit of Chinese Application No. 200820085195.4, filed Apr. 3, 2008.

TECHNICAL FIELD

This invention involves the driving mechanism in the slide cover hinge of the mobile communication terminal.

BACKGROUND

At present, the slide cover hinge structure is very popular among the mobile communication terminals such as mobile phone and PHS (personal Handy-phone System), whose upper cover and lower cover are connected by the hinge. The semi-automatic slide cover hinge is a common hinge used for the slide cover connection structure, which is provided with a driving mechanism for the slide cover. It is always the case that the driving spring is used as the driving part in such mechanism. When the operator pushes the slide cover, the driving spring saves the energy produced by the deformation area such as stretching, compression or torsion. When the operator pushes the slide cover beyond the critical point, that is, after the spring is converted from the energy saving to the energy release, the slide, driven by the spring, can slide on. The existing driving mechanism provided with compression spring and tension spring has a problem of being complicated in structure.

SUMMARY OF INVENTION

The technical issue to be settled by this invention is to provide a combined driving spring in the slide cover hinge of the mobile communication terminals which can simplify the structure of the driving mechanism. For this purpose, this invention adopts the following technical schemes: it comprises multiple springs in the same shape, the said multiple springs are arranged and combined on the same plane in turn, with both ends fixed; the said driving spring is provided with connections on its both ends to match with the slide in the slide cover hinge.

The shape of the said spring is similar to the shape W.

With the technical scheme of this utility model employed, the driving spring provided by this invention can be directly used as the driving mechanism in the slide cover hinge of the mobile communication terminal, simplifying the structure of the driving structure. In particular, when the spring in the shape of W is employed, the spring can not only facilitate the combination connection, but also provide a greater force. Besides, when the slide cover slides, less area is occupied when the spring deforms, making it easier to arrange other parts of the mobiles device.

BRIEF DESCRIPTION OF THE DRAWINGS

FIG. 1 is the general view for the embodiment 1 of this invention.

FIG. 2 is the exploded view for the embodiment 1 of this invention.

FIG. 7 is the sectional view of the connector 16 in embodiment 1.

EMBODIMENT

Figure 3:
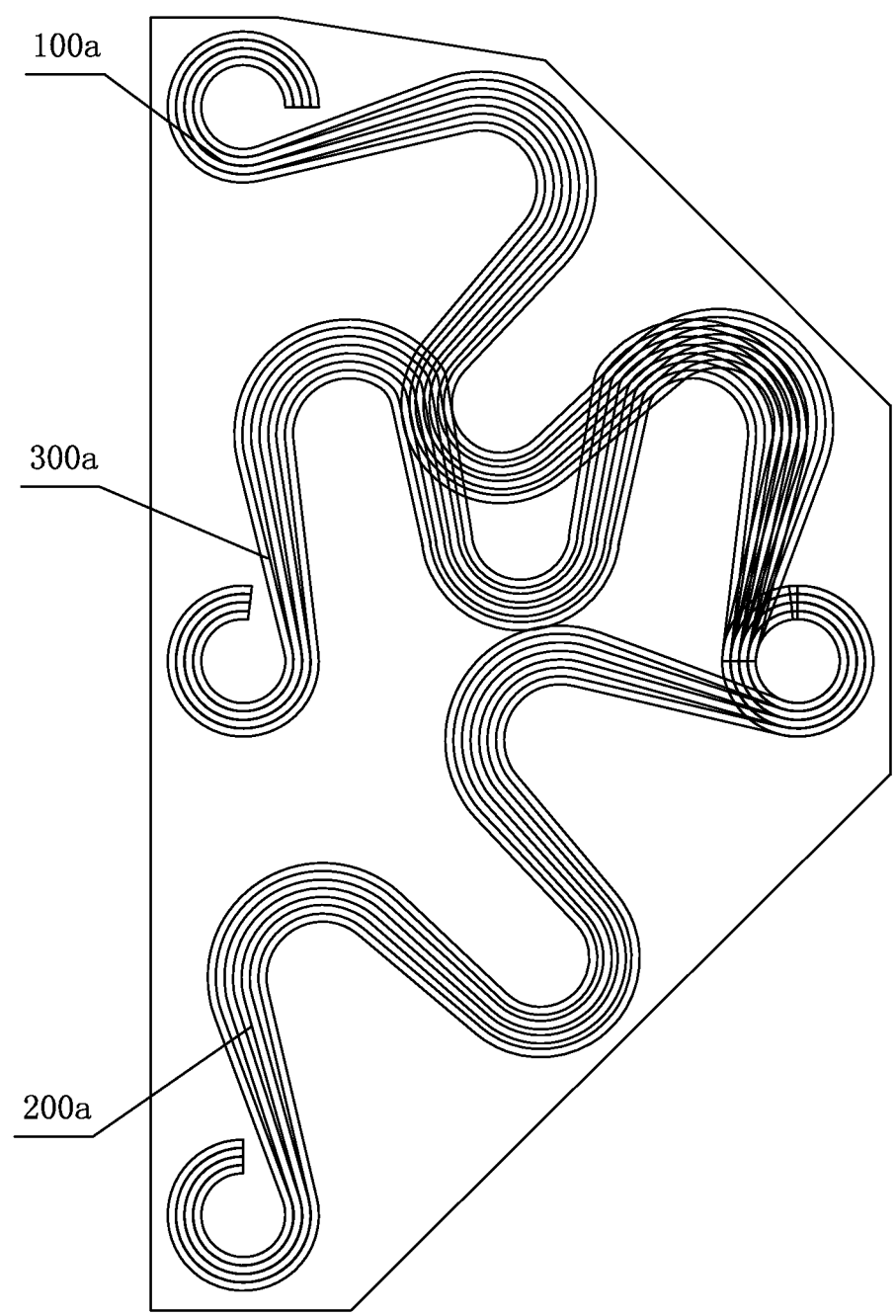
FIG. 3 is the movement state view for the embodiment 1 of this invention.
Figure 4:
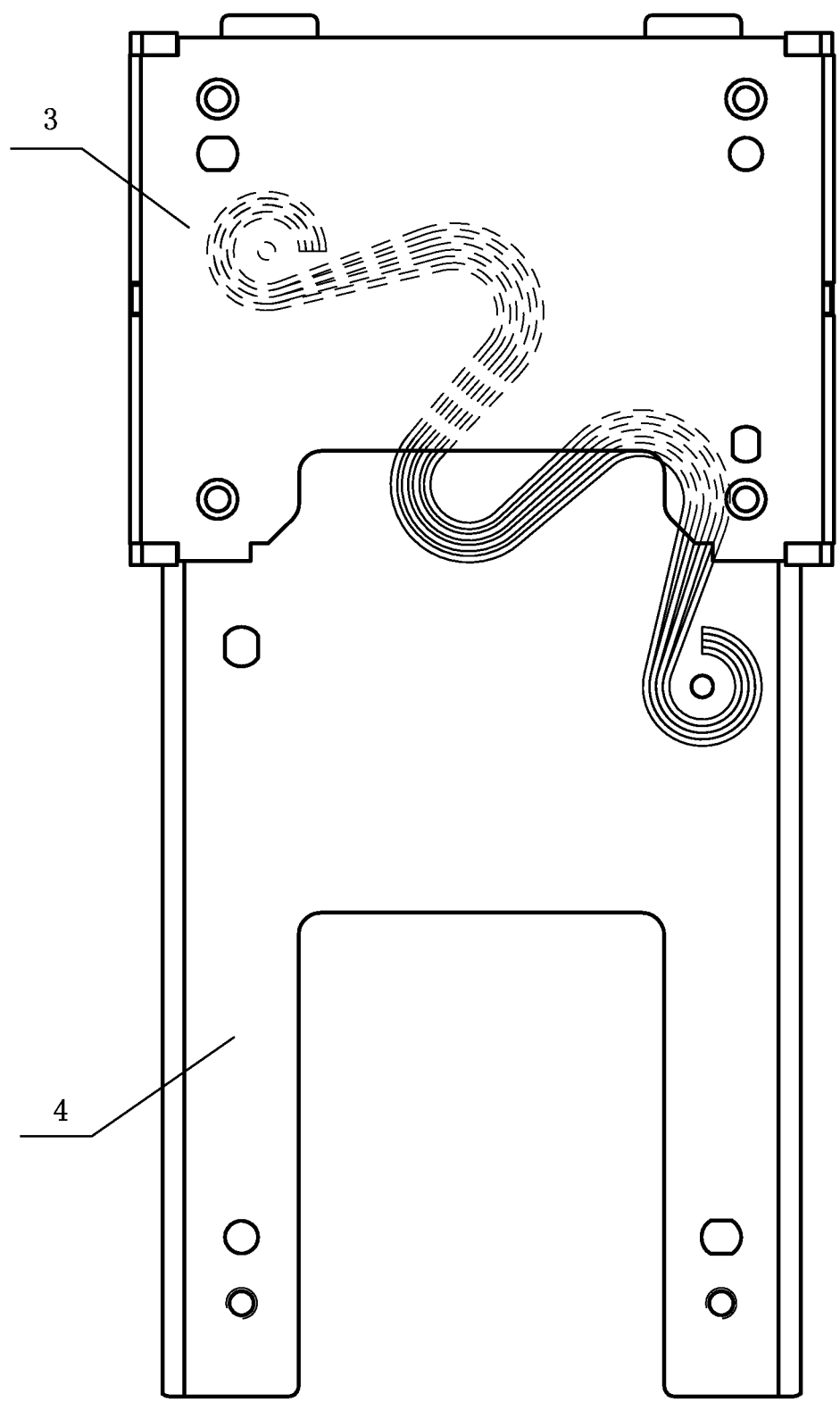
FIG. 4 is the first state view for the embodiment 1 of this invention after the connection with the slide is made.
Figure 5:
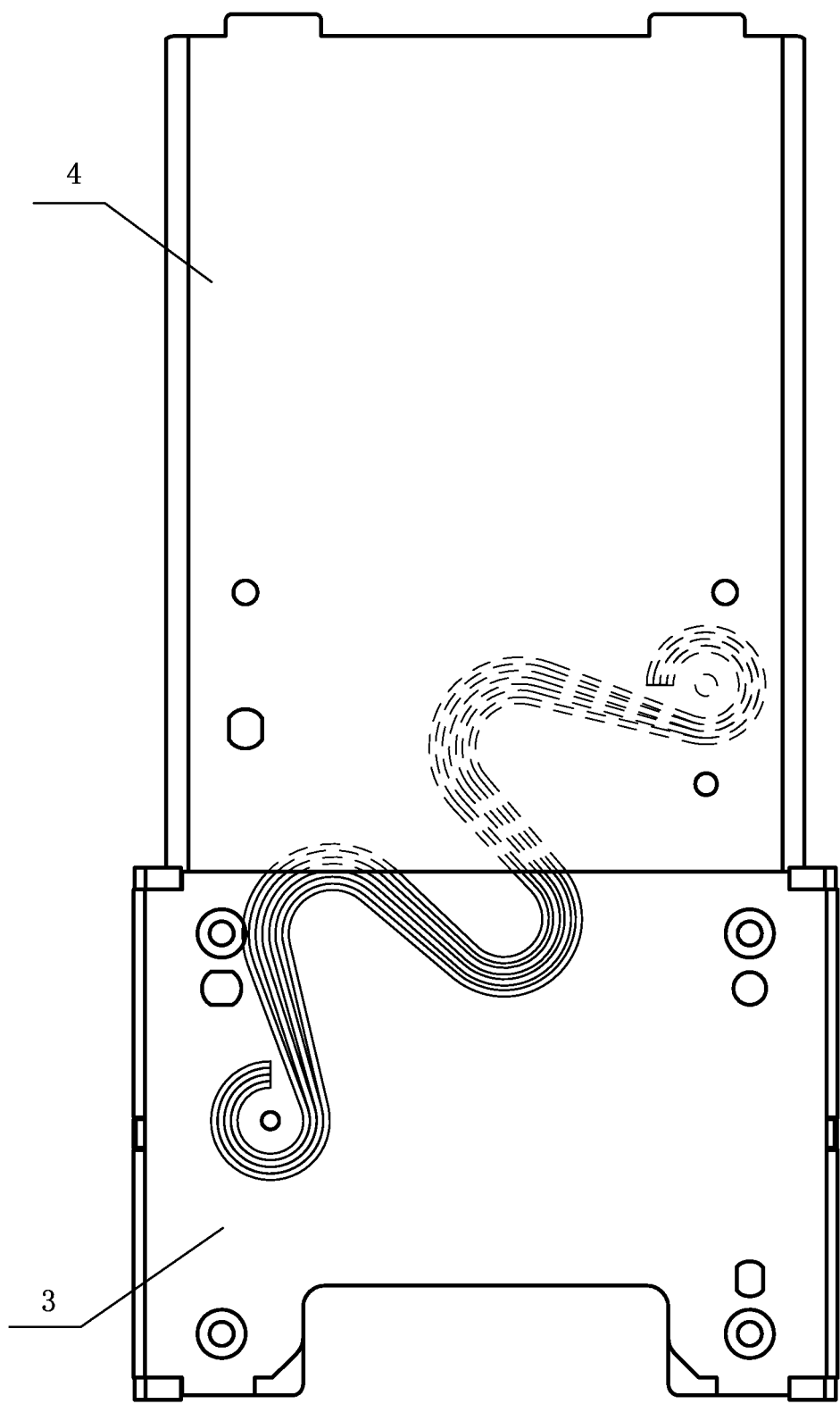
FIG. 5 is the second state view for the embodiment 1 of this invention after the connection with the slide is made.

Refer to the figures attached. This invention comprises multiple springs in the same shape. Four springs are provided in this embodiment, whose mark numbers in the figures are respectively 11, 12, 13 and 14. Other number of springs may be provided as required in practice. The springs in this embodiment are the W-shaped springs.

The said multiple springs are arranged and combined on the same plane in turn, with their both ends fixed. The said fixation can be the direct fixation among the springs, for example by welding; or the both ends of the springs are fixed on connecting piece to achieve the said fixation; or both the above-mentioned modes are adopted at the same time.

In this embodiment, the both ends of the said driving spring are provided with the connections to match with the slide in the slide cover hinge, with the springs bent into circle-shaped hook 15 at the connection, and as shown in the figures, the circle-shaped hook 15 at the end of the springs 11,12,13 and 14 are nested in turn, and their inner bores can be connected with the rivet 18 on the slide in the slide cover hinge to achieve the connection of the driving mechanism with the slide.

The connector 16 with hole may also be fixed at the said connection. The said connector 16 assumes a shape of step with its top extending outward 17. The thinner part of the connector 16 is inserted into the inner hole on the end of spring for fixing. At this time, what is connected with the rivet 18 is the connector 16. The top of the connector 16 extends outward 17 and extends outward 17 can also be fixed together with circle-shaped hook 15 on the end of the spring, thus playing a role of the connecting piece as mentioned above.

The cross-sections of the said spring 11, 12, 13 and 14 assume rectangles for easy assembly and fixation. Of course, the shape of the cross-section may be circle.

Figure 6:
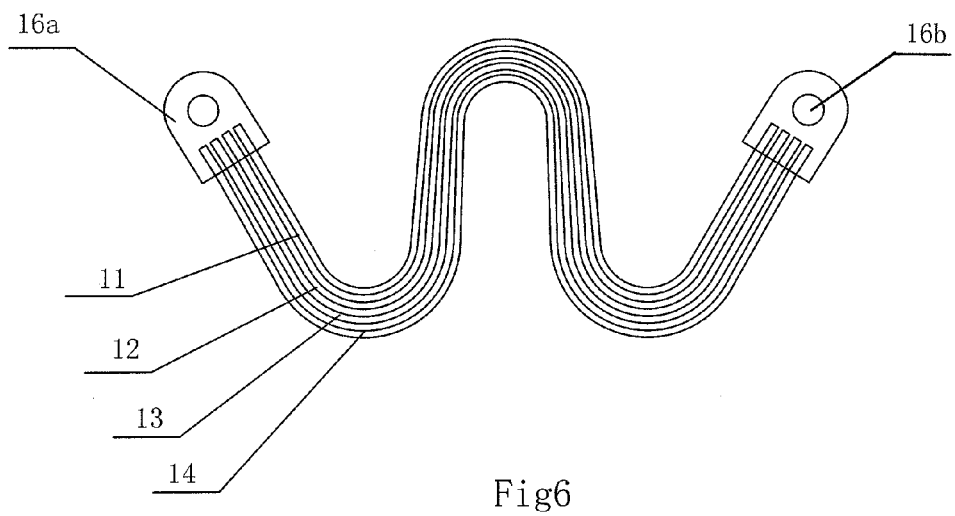
FIG. 6 is the sectional view for another connection and fixation mode of the spring of this invention.

Referring to FIG. 6, the said springs 11, 12, 13 and 14 may be fixed in other ways: their two ends are fixed on the connecting piece 16a by inlay injection or metal sheet welding. The said connecting piece is provided with the said connection. Such connection is the connecting hole 16b.

In addition, the said driving spring may be connected with clamping pieces on its both ends. The said clamping piece is provided with the said connection. The springs 11, 12, 13 and 14 are fixed by connecting with the clamping piece.

The mark numbers 100a and 200a in the figure respectively denote the states of the driving mechanism when the slide arrives at two movement limit positions. The mark number 300a in the figure denotes the intermediate state of the above-mentioned two states. The mark numbers 3 and 4 in the figure respectively denote the upper slide and lower slide in the slide cover hinge connected by the driving spring.

What is claimed is:
1. A combined driving spring in a slide cover hinge of a substantially flat cover of a mobile communication terminal comprising:
a plurality of elongated member springs, each member spring being in a W-shape in a flat plane parallel to a major surface of the cover, the W-shape having, in the flat plane, two wings, a single peak between the two wings, and a first end and a second end at respective ends of the two wings, when viewed in the same flat plane, the two wings being substantially mirror-symmetrical about the peak, and the first end and the second end of the W-shape being substantially mirror-symmetrical about the peak, the peak extending beyond a straight line connecting the two ends of the two wings, in the same flat plane, said member springs being stacked in a direction that extends within the flat plane, so as to be parallel with each other in the flat plane, and being connected along their elongated sides in the flat plane, said first ends of the member springs being combined together into a first end for the combined driving spring, said second ends of the member springs being combined together into a second end for the combined driving spring; each of said first end and second end of said driving spring being connected with the slide cover hinge through a respective one of two connectors, when viewed in the same flat plane, the two connectors being substantially mirror-symmetrically located about a straight line connecting respective tops of the peaks, and the first end and the second end of said driving spring being substantially mirror-symmetrical about the straight line connecting respective tops of the peaks.

2. The combined driving spring according to claim 1, wherein each of the first end and second end of the driving spring is made into a circle-shaped hook, respectively, in the flat plane;

wherein each of the connectors is a combination of a rivet and a flanged nut with a central hole for receiving the rivet; and wherein said rivet and said flanged nut sandwich said first and second ends of said driving spring, respectively.

3. The combined driving spring according to claim 1, wherein the first and second ends of the driving spring are fixed with the connectors by inlay injection.

4. The combined driving spring according to claim 1, wherein the first and second ends of the driving spring are fixed on the connectors by sheet metal welding.

5. The combined driving spring according to claim 1, wherein a cross-section shape of each member spring is a rectangle.

6. The combined driving spring according to claim 1, wherein each of the first end and second end of each member spring is a hook in the flat plane;

the first ends of the member springs are stacked in a direction extending within the flat plane; and the second ends of the member springs are stacked in a direction extending within the flat plane.

7. A combined driving spring in a slide cover hinge of a substantially flat cover of a mobile communication terminal comprising:

a plurality of elongated member springs, each member spring being in a W-shape when viewed in a flat plane substantially parallel to a major surface of the cover, the W-shape having, when viewed in the flat plane, two outer straight lines of the letter W, and a single peak between the two outer straight lines, the two outer straight lines including a first straight line and a second straight line, the first and second straight lines each extending from a lower part of the letter W to an upper part of the letter W and each including an upper end that is fixedly attached to the slide cover hinge and a lower end that is connected to the remainder of the letter W, the peak extending beyond a straight line connecting the two upper ends of the two outer straight lines, when viewed in the flat plane, the member springs being stacked in a direction that extends within the flat plane, so as to be parallel with each other in the flat plane, and being connected along their elongated sides in the flat plane, the upper ends of the first straight lines of the member springs being combined together into a first end for the combined driving spring, the upper ends of the second straight lines of the member springs being combined together into a second end for the combined driving spring; each of the first end and second end of the combined driving spring being connected with the slide cover hinge through a respective one of two connectors.

* * * * *